(12) United States Patent
Kunzelman

(10) Patent No.: US 6,312,596 B1
(45) Date of Patent: Nov. 6, 2001

(54) ABSORBENT BAG

(76) Inventor: Richard J. Kunzelman, 209 West St., Geneva, IL (US) 60134

( * ) Notice: Subject to any disclaimer, the term of this patent is extended or adjusted under 35 U.S.C. 154(b) by 0 days.

(21) Appl. No.: 09/570,016

(22) Filed: May 12, 2000

(51) Int. Cl.$^7$ .................................................... B01D 29/11
(52) U.S. Cl. ................................... 210/242.3; 210/242.4; 210/484; 210/924
(58) Field of Search ........................... 210/242.3, 242.4, 210/484, 485, 922, 923, 924, 693; 99/496

(56) References Cited

U.S. PATENT DOCUMENTS

| | | | |
|---|---|---|---|
| 2,394,895 | * | 2/1946 | Burhans . |
| 2,736,433 | * | 2/1956 | Fresch . |
| 2,781,914 | * | 2/1957 | De Voe . |
| 2,994,435 | * | 8/1961 | Moore . |
| 3,088,594 | * | 5/1963 | Yelinek . |
| 3,617,566 | * | 11/1971 | Oshima et al. . |
| 3,701,258 | * | 10/1972 | Rhodes . |
| 3,739,913 | * | 6/1973 | Bogosian . |
| 4,111,813 | * | 9/1978 | Preus . |
| 4,197,204 | * | 4/1980 | Mathes . |
| 4,340,486 | * | 7/1982 | Swanson . |
| 4,401,447 | * | 8/1983 | Huber . |
| 4,833,852 | * | 5/1989 | Wells et al. . |
| 5,165,821 | * | 11/1992 | Fischer et al. . |
| 5,181,802 | * | 1/1993 | Thengs et al. . |
| 5,229,006 | * | 7/1993 | Brinkley . |
| 5,451,325 | * | 9/1995 | Herkenberg . |
| 5,705,076 | * | 1/1998 | Brinkley . |
| 6,152,025 | * | 11/2000 | Oien et al. . |

* cited by examiner

Primary Examiner—Joseph W. Drodge
Assistant Examiner—Terry K. Cecil
(74) Attorney, Agent, or Firm—John L. Schmitt

(57) ABSTRACT

A bag, particularly adapted for absorbing hydrocarbons dispersed in smaller quantities of water, has a ball-like shaped body formed from oleophobic netting materials. The bag body includes a tubular-shaped outer sleeve positioned about a tubular-shaped inner sleeve to form an interior space therebetween. Adjacent end portions of each sleeve then are connected so that an absorbent medium in the bag interior space is fully enclosed. The inner sleeve defines a central passageway through the bag. To hold the bag during use, a cord loop may be disposed in the central passageway with a knotted end of the cord joined with one of the sleeve end portion connections. A looped end of the cord then extends from an opposite end of the central passageway to provide convenient means for attaching the bag to a support while the bag is immersed in a hydrocarbon-water mix. As hydrocarbons are drawn to strands of the bag netting and then collect in voids of the netting, the bag discolors. When sufficiently discolored, the bag is withdrawn for external cleaning or disposal.

9 Claims, 3 Drawing Sheets

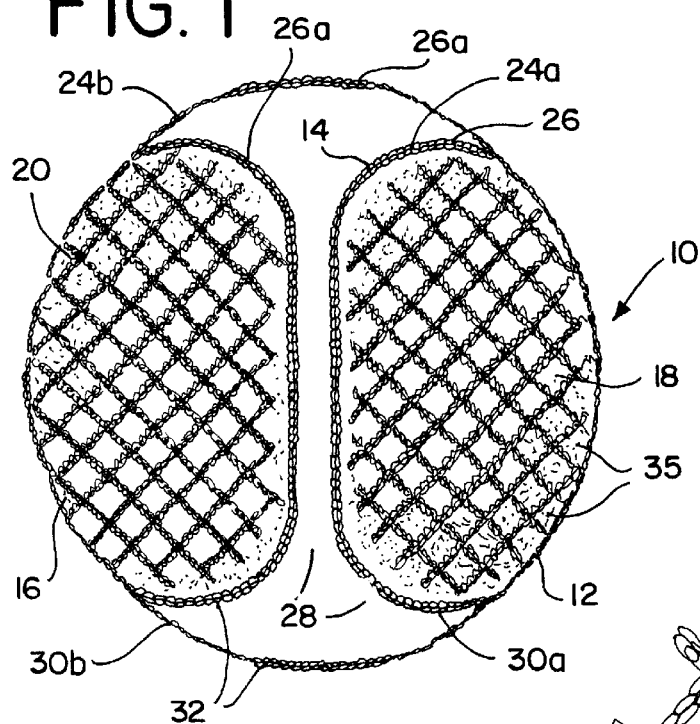
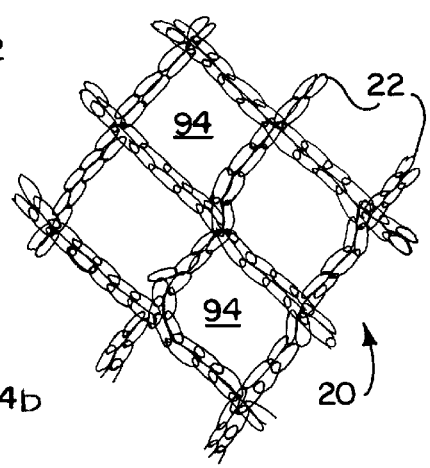
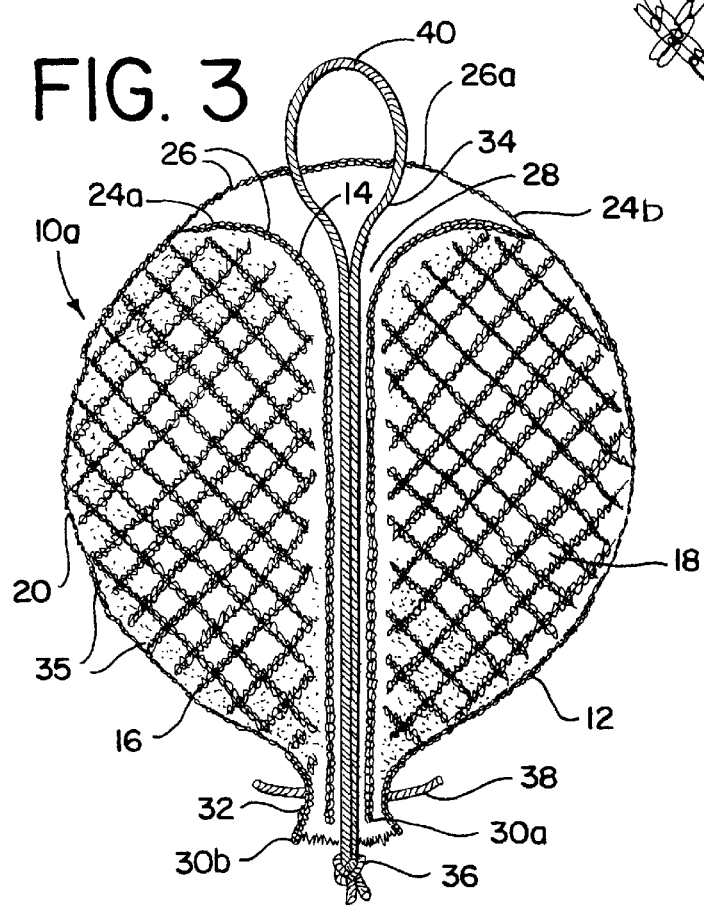

ABSORBENT BAG

BACKGROUND OF THE INVENTION

1. Field of the Invention

This invention relates generally to devices for separating hydrocarbons from a hydrocarbon-water mix and more particularly to an absorbent bag that may be readily immersed, for example, in a sump filled with machine tool coolant to absorb oils from that coolant and then be withdrawn from the sump to remove the absorbed oils.

2. Prior Art

Devices that collect and then remove hydrocarbons from a water source are well known and been in use for many years. Examples of several such devices are described below.

The first example of an oil collecting device is set out in U.S. Pat. No. 3,739,913. This device includes a netting material formed into a hollow, cylindrical shaped container. Inside the container is a fiber mass. Preferred fiber materials include rayon, nylon, and cord reclaimed from old tires. Glass fibers may be added to keep the fiber mass fluffy and loose. Ends of the container are secured to a rope that extends centrally through an interior of the container.

A second example of an oil absorbing devices is shown and discussed in U.S. Pat. No. 3,701,258. This second device includes an elongated oil mop in the form of an endless loop. The rope loop has a core that holds an array of outward extending oil absorbing fibers.

An oil absorbing mat, disclosed in U.S. Pat. No. 4,832, 852, is a third device example. This mat comprises a pair of a non woven, cotton fiber webs spaced apart by a scrim sheet of woven polypropylene. Edges of the webs and sheet are stitched together with waxed threads.

U.S. Pat. No. 5,181,802 sets out the last oil absorbing device to be discussed. This device comprises a set of modules. Each module includes a tubular shaped stocking formed of a mesh material that promotes liquid permeability. Extending along respective vertical side edges of each stocking is a wire having outward extending horizontal hooks. The hooks of adjacently positioned modules hold the modules together. Inside each stocking is a specially prepared wood fiber mass. This mass is compartmentalized by spaced apart partitions sewed into each stocking. Seemingly, closure of ends of the stockings is effected by the wires.

SUMMARY OF THE INVENTION

A bag of this invention, particularly adapted for removing hydrocarbons from smaller quantities of a hydrocarbon-water mix, has a ball-like shaped body. The body of the bag includes an inner sleeve spaced from an outer sleeve. Adjacent end portions of each sleeve are joined to form connections that fully enclosed an interior space between the sleeves. The inner sleeve defines a central passageway through the bag body. The inner and outer sleeves are formed from a netting material of polypropylene strands or other like oleophilic, hydrophobic materials. The interior space of the bag is filled with an absorbent medium that may be the same netting material used for the bag sleeves.

For use, this inventive bag is immersed in a mix of oil and water held by a container, for example. The netted structure of the bag body and absorbent medium permits the mix to flow freely into the bag interior space. Oils in the mix are drawn to strands of the netting and collect in voids defined between the strands. As the bag becomes saturated, the bag discolors indicating a need for withdrawal and cleaning or disposal. During withdrawal residual mix in the bag drains back into the container.

The absorbent bag of this invention provides several advantages over oil collecting devices presently known or in use.

A first advantage is that the bag is small, having a diameter that may vary from two to six inches. Bag size is customized based on intended use. For example, larger size bags are particularly useful for removing oils from an intermediate size mix such as oils from coolant held in a sump associated with small machining operation. As is well known, oil contaminated coolant generates smoke during reuse and is vulnerable to undesired bacteria growth. An example of small bag use is oil removal from bilge water that collects about an engine of a boat.

A second advantage is that the bag may include a cord loop to maintain the bag in a partially submerged state during use. This cord is carried in the central passageway of the bag with a knotted end of the cord secured to one of the sleeve end portion connections. As secured, the cord end and the sleeve end portion connection are drawn in an adjacent end opening to the central passageway. An opposite looped end of the cord then extends from an opposite end opening to the central passageway. The included cord insures that the bag remains in a location where bag discoloration may be readily observed.

A third advantage is that a floatation strip may be added to the absorbent medium of the bag to maintain the bag at an optimum absorption level. Since oils in a mix typically tend to collect near a top surface of the mix, the bag performs best when the bag is half submerged. Additionally, where the level of the oil-water mix varies over time, the floatation model of this inventive bag remains is an observable location.

Another advantage of this inventive oil absorbent bag is that bag use does not require any auxiliary mechanical equipment. Placement and removal of the bag are done by hand, and oil collection, retention, and removal are effected solely by the bag structure.

A still further advantage is that the bag is inexpensive. First, the netting material for the sleeves and absorbent medium is a ready commercially available material. Additionally, the bags are hand formed by workers having ordinary hand dexterity. Operational expense also is minimized because the bag is reusable. A saturated bag may be cleaned, for example, by hand wringing, mechanical wringing, or rinsing in a parts washer.

Lastly, this inventive bag is highly absorbent, having a saturated weight-clean weight ratio of about 50 to one. A one-ounce bag may absorb about three pounds of oil. The ability of this inventive bag to absorb and then retain large quantities of oil results from the oleophilic nature of polypropylene strands of the netting and the capillary effect from the netting voids and interstices between strands of the netting. Note that because the mix may flow into the bag through the outer sleeve and through the inner sleeve from the central passageway, the bag quickly reaches its saturation weight. This same structure then allows residual nix in the bag to drain from the bag as the bag is being withdrawn. Only a minimal amount of water is retained.

DESCRIPTION OF THE DRAWING FIGURES

FIG. 1 is a cross sectional view of a first embodiment of a bag of this invention.

FIG. 2 is a detailed view of an area of netting material used to form the bags of this invention.

FIG. 3 is a cross sectional view of a modified form of the bag of FIG. 1.

DESCRIPTION OF THE PREFERRED EMBODIMENT

Figure 4:
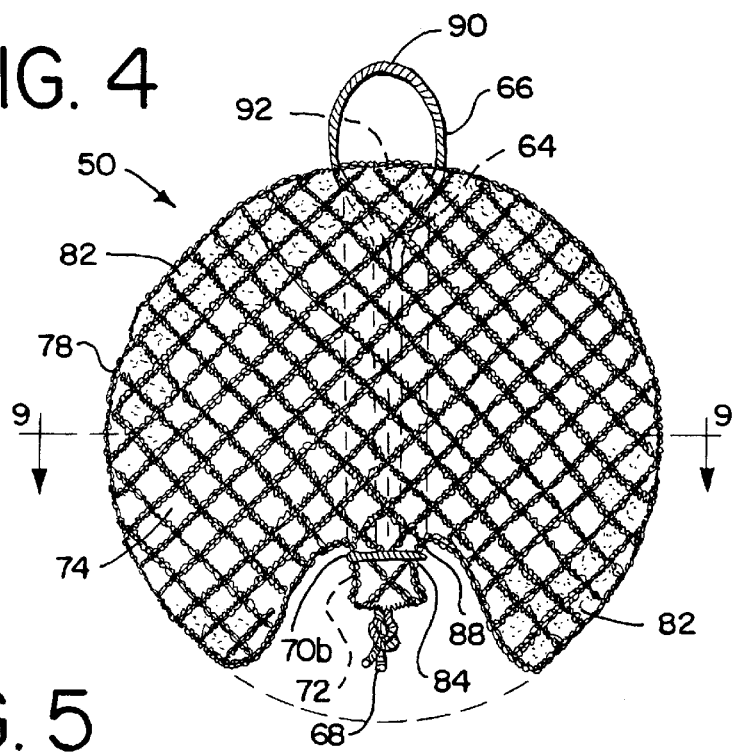
FIG. 4 is a side elevation view partially in section of a heavy-duty embodiment of the inventive bag.

A first embodiment of an absorbent bag of this invention is shown generally in FIG. 1 and designated 10. The bag 10 has a ball-like body 12 comprising an inner sleeve 14 spaced from an outer sleeve 16 to form an interior space 18. The sleeves 14, 16 are made from a single ply of netting material 20 formed of strands 22, see FIG. 2. The preferred material for the strands 22 is a fibrillated polypropylene, 360 denier yarn.

First ends 24a, 24b of the inner and outer sleeves 14, 16 are joined by a first connection 26. The first connection 26 may be, for example, a fold 26a formed by a length of sleeve netting 20 being folded over itself A central passageway 28, defined by the inner sleeve 14, extends through the bag body 12. Second ends 30a, 30b of the inner and outer sleeves 14, 16 are cut, for example. Where cut, these second ends 30a, 30b are joined by a second connection 32 in the form of a seam secured by heat or mastic.

With the inner and outer sleeves 14, 16 joined by the first and second connections 26, 32, the interior space 18 of the bag body 12 is fully enclosed to hold an absorbent medium 35. While there are a number of materials oleophilic in nature that could be used, a two-foot long piece of the netting 20 spirally wound in the bag interior space 18 about the inner sleeve 14 is an effective absorbent medium 35. With the absorbent medium 35 in place, density of the bag 10 is about 0.3 lbs./cu.ft.

As seen in FIG. 3, the bag 10 has been modified to include a cord loop 34. The cord 34 is carried in the central passageway 28 and has a knotted end 36. This cord-included embodiment of the bag is designated 10a. In the case of the bag 10a, the second connection 32 of the second ends 30a, 30b of the inner and outer sleeve 14, 16 is formed by gathering the second ends 30a, 30b about a knotted end 36 of the cord loop 34. Once gathered, the inner and outer sleeve second ends 30a, 30b and the cord knotted end 36 are bound by a length of string 38 that is wound thereabout and knotted.

The bag 10 is particularly useful for removing oils from a mix where the oils in the mix are widely dispersed. In this case, the bag 10 simply is immersed in the oil-water mix. As the bag 10 sinks, it quickly absorbs oils in the mix. When saturated, the bag 10 of FIG. 1 may be removed using a fish net type tool, for example.

With respect to the bag 10a, the cord 34 provides support. A looped end 40 of the cord 34 is slipped over a bracket (not shown) attached to the container holding the mix, for example, so that the bag 10a only partially submerges. The cord 34 then provides more convenient means for removing the bag 10a when saturation is indicated by bag discoloration.

Note that the weight of the bag 10a, when saturated with oil, tends to pull the second connection 32 into the central passageway 28 of the bag 10a to form a plug. This plug is shown typically in FIG. 4, which depicts a further bag embodiment, and is discussed in greater with respect to this further embodiment. Regardless, the structure of bag 10 or 10a is particularly adapted for smaller size bags, two-inch in diameter for example, where the weight of a saturated bag 10 or 10a does not exceed two pounds.

A further embodiment of the inventive bag is shown generally in FIG. 4 and designated 50. Structure of the bag 50 is particularly adapted for larger bag sizes, for example six inches in diameter. The structure of the bag 50 is more easily understood by describing the steps undertaken to form the bag 50.

Figure 5:
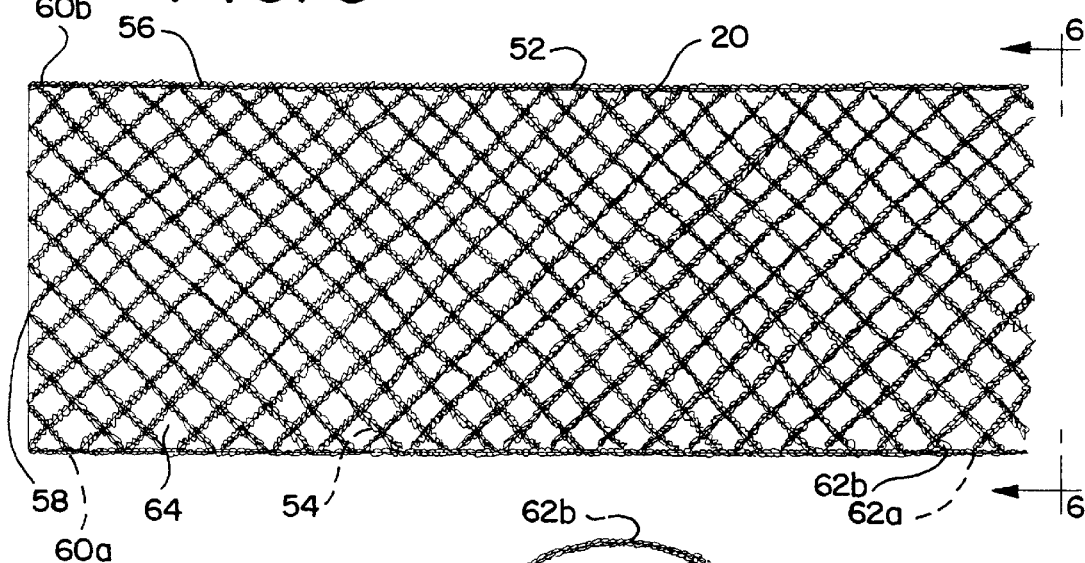
FIG. 5 is a side elevation view of a sleeve of the bag of FIG. 4 where an outer section of the sleeve has been folded over an inner section of the sleeve to form a 2-ply sleeve.
Figure 6:
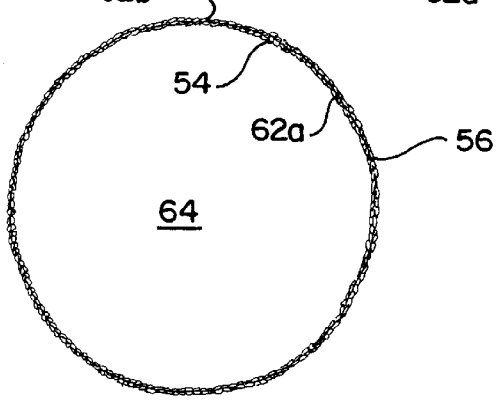
FIG. 6 is an end elevation view of the sleeve as seen generally along the line 6—6 of FIG. 5.

A first step requires forming a two-ply sleeve 52 comprising two layers of netting material 20, see FIGS. 5 and 6. The sleeve 52 is made by folding a sleeve length over itself so that the sleeve 52 comprises a sleeve inner section 54 and a sleeve outer section 56. As formed, an end fold connection 58 joins folded end potions 60a, 60b of the sleeve inner and outer sections 54, 56. An opposite end of the two-ply sleeve 52 is defined by cut end portions 62a, 62b of the sleeve sections 54, 56. The cut end portions 62a, 62b are aligned, see FIG.5 Then, as best seen in FIG. 6, the sleeve 52 has a central passageway 64 defined by the sleeve inner section 54.

Figure 7:
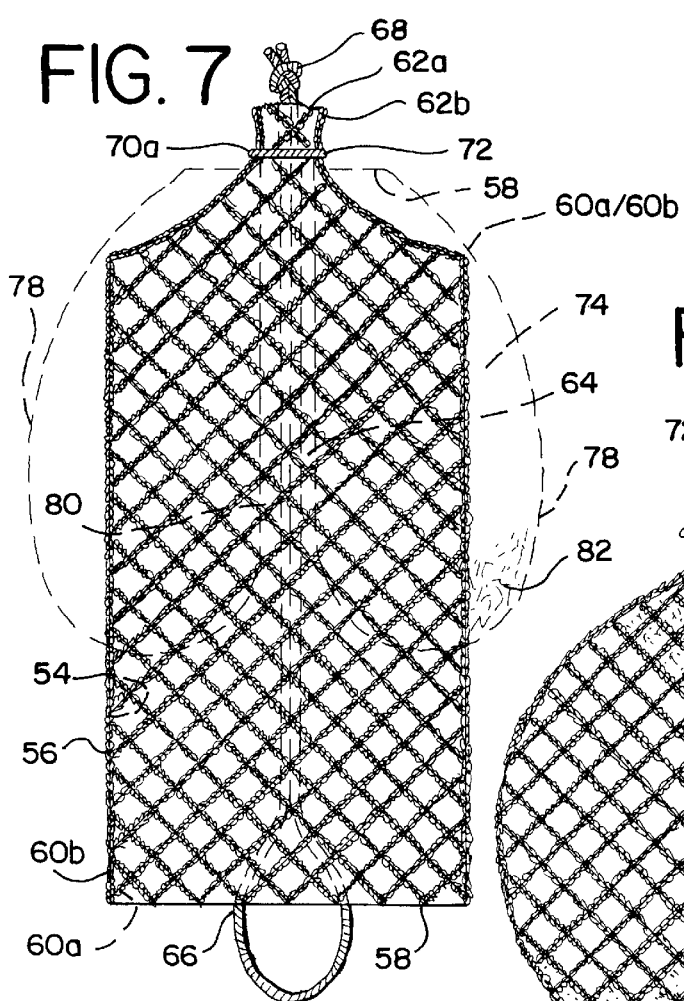
FIG. 7 is a side elevation view of the sleeve of FIG. 5 as it appears during intermediate stages of forming the bag of FIG. 4

A second step when forming the bag 50 is best understood by viewing FIG. 7. First, a length of a cord loop 66 is placed in the central passageway 64 so that a knotted end 68 extends just beyond the cut end portions 62a, 62b of the sleeve inner and outer sections 54, 56. These cut end portions 62a, 62b then are gathered about the cord knotted end 68. Once gathered, the end portions 62a, 62b and the cord knotted end 68 are bound by a length of string 70a that is wound thereabout and knotted to form a first knot end connection 72.

Again referring the FIG. 7, after tying off the cut ends portions 62a, 62b, the next step is to wrap the end fold 58 up toward the sleeve body section cut end portions 62a, 62b to form an interior space 74 in the bag 50. This wrapping concurrently creates an outer shell 78 and an inner shell 80. The outer shell and inner shell 78, 80 are shown by broken lines in FIG. 7.

The outer shell 78 comprises in part the sleeve inner section folded end portion 60a and the sleeve outer section folded end portion 60b. The inner shell 80 comprises in part the sleeve inner section cut end portion 62a, and the sleeve outer section cut end portion 62b. Note that the bag central passageway 64 now is defined by the inner shell 80. Like the bag 10, the interior space 74 of the bag 50 is filled with an absorbent medium 82. In this case the absorbent medium 82 may be a three-foot long piece of the netting material 20 spirally wound in the bag interior space 74 about inner shell 80. With the absorbent medium 82 positioned in the interior space 74, density of the bag 50 proximates 0.309 lbs./cu.ft.

Figure 8:
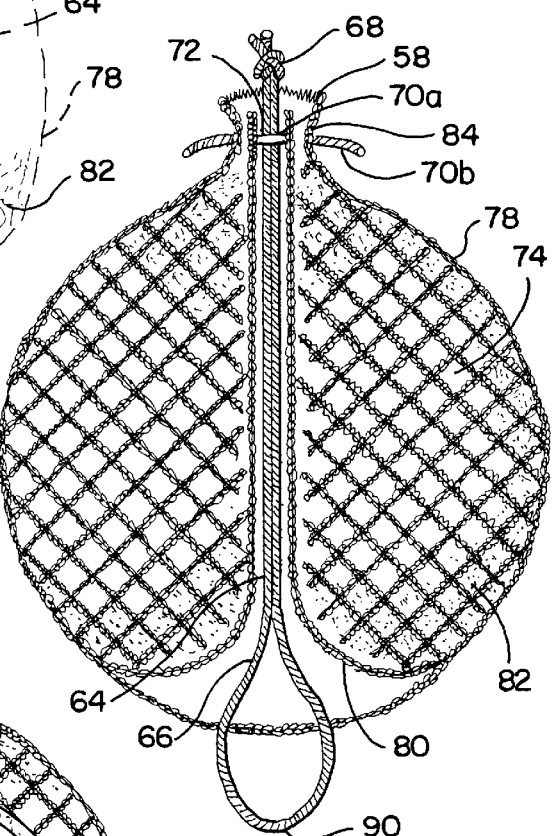
FIG. 8 is a cross sectional view of the bag of FIG. 4 as it appears immediately before being formed as shown in FIG. 4.

To hold the absorbent medium 82 in place, wrapping up the outer shell 78 continues until an end fold connection 58 of now the outer shell 78 aligns with the first knotted end connection 72. With the end fold connection 58 of the outer shell 78 then gathered about the first connection 72, a second length of string 70b is wound about the end fold connection 58 and knotted to form a second knotted end connection 84, see FIG. 8.

Lastly, the bag 50, as seen in FIG. 4, is inverted and the first and second connections 72, 84 are pressed into the central passageway 64. Locating these connections 72, 84 in the bag central passageway 64 forms these connections 72, 84 into a tapered-shaped plug 88. Additionally, movement of these connections 72, 84 extends a looped end 90 of the cord 66 from a top opening 92 of the central passageway 64 of the bag 50.

The structure of the bag 50 functions much like the structure of the bags 10 and 10a to produce a like result. Using the bag cord 66 for support, a clean bag 50 is partially submerged in an oil-water mix. The open structure of the inner and outer shells 78, 80, as provided by now two-plies of the netting material 20, allows the mix to readily flow through the netting 20 of the outer shell 80 and into the netting 20 comprising the absorbent medium 82.

The inflow of mix is multidirectional since the mix also flows through the passageway top opening 92, into the central passageway 64 and though the netting material 20 of the inner shell 80. Oils in the mix are drawn to the netting strands 22 and collect in voids 94 between the strands 22 and in other interstices formed by the close but loose proximate relationship of convolutions 100 of the spirally wound absorbent medium 82. When the color of the bag 50 darkens indicating saturation, the bag 50 is removed for cleaning. As the bag 10 is withdrawn, residual mix in the bag 50 readily drains back into the mix. During cleaning the bag 50 only contains a small quantity of mix.

Figure 9:
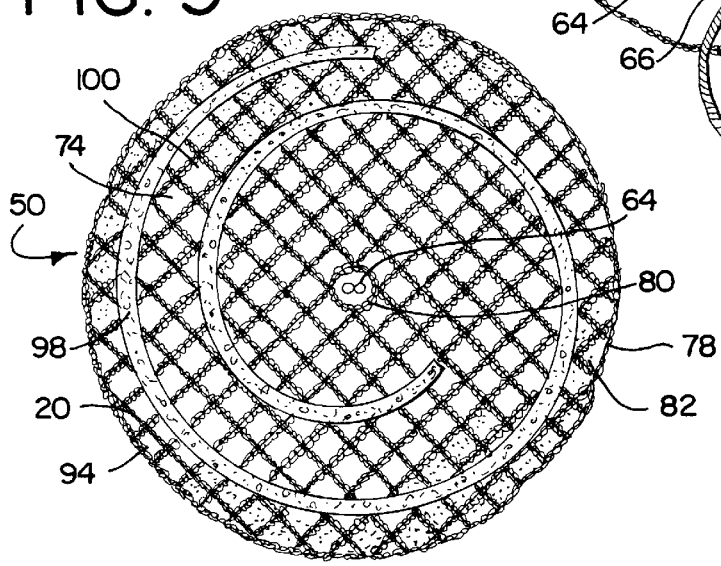
FIG. 9 is a cross sectional view as seen generally along the line 9—9 of FIG. 4 wherein a floatation strip has been added to absorbent medium in the bag interior space.

Note that during removal the now saturated bag 50 may weigh as much as five pounds. The force of gravity from the weight of the absorbed oils promotes release of the cord knotted end 68 from the plug 88 and upward movement of the plug 88 in the central passageway 64. However, plug structural and location integrity is maintained by an opposing wedging action from the tapered-shaped plug 88 interacting with the two-ply structure of the inner shell 78.

Where the level of the oil-water mix raises and falls sufficiently that the bag 50 occasionally becomes filly submerged, a floatable bag is recommended. As seen in FIG. 9, the absorbent medium 82 of the bag 50 includes a floatation strip 98. One preferred strip material is a polypropylene foam available from Astro-Valcour, Inc. of Wurtland, Ky. and identified by the trademark MICROFOAM. The strip 98 is wound in a spiral pattern to fit between the convolutions 100 of the netting material 20 forming the absorbent medium 82. It should be understood that the bags 10 and 10a also may include like flotations strips 98 to remain fully in sight during use.

While embodiments, uses, and advantages of this invention have been shown and discussed, it should be understood that this invention is limited only by th scope of the claims. Those skilled in the art will appreciate that various modifications and changes may be made without departing from the scope and spirit of the invention, and these modifications and changes may result in further uses and advantages.

What I claim is:

1. A porous bag particularly adapted for removing hydrocarbons from a hydrocarbon-water mix, said bag comprising:

an inner sleeve, a central passageway extending through said inner sleeve, an outer sleeve positioned about said inner sleeve, an interior space formed between said inner sleeve and said outer sleeve, connections between said inner and outer sleeves formed by joining adjacent ends of said inner sleeve and said outer sleeve, an absorbent medium carried in said interior space, a cord carried in said central passageway with a knotted end of said cord carried by one said connection between said sleeve ends to form a knotted end connection, and an opposite end of said cord extended from an opposite end of said central passageway, wherein for use said bag is immersed in said mix, said mix flows into said bag interior space through said inner and outer sleeves where said hydrocarbons in said mix adhere to said absorbent medium and saturate said bag, and then as said bag is withdrawn from said mix to effect a reduction of hydrocarbons in said mix, residual mix in said bag drains therefrom and said cord provides convenient means for removing said bag from said mix.

2. A bag as defined by claim 1 and further characterized by, said cord knotted end connection comprises cut ends of said sleeves gathered about said cord knotted end and secured by a string.

3. A bag as defined by claim 1 and further characterized by, said cord knotted end connection being located in said central passageway to form a tapered-shaped plug, wherein wedging action between said plug and said inner sleeve inhibits release of said cord knotted end from said connection and movement of said plug in said central passageway.

4. A bag for removing oils from an oil-water mix, said bag comprising:

an inner sleeve formed of porous material, a central passageway extending through said inner sleeve, an outer sleeve formed of a porous material, said outer sleeve positioned about said inner sleeve to form an interior space therebetween, an absorbent medium formed of porous, oleophobic material, said medium carried in said interior space, a fold connection joining adjacent first ends of said inner sleeve and said outer sleeve, a cord carried in said central passageway, and a plug located in said passageway and comprising one end of said cord joined with adjacent second ends of said inner and outer sleeves, wherein, for use said cord may be attached to a support to maintain said bag in a partially submerged state, said mix flows into said interior space through said inner and outer sleeves, oils in said mix adhere to said absorbent medium, and then said bag is removed from said mix upon said bag becoming saturated with said oils.

5. A bag as defined by claim 4 and further characterized by said bag including, floatation means carried by said absorbent medium, wherein said bag remains in said partially submerged state when a level of said mix rises.

6. A bag for absorbing oils in an oil-water mix, said bag comprising:

a sleeve having a two-ply porous body defined by an inner section joined to an outer section by an end fold connection comprising folded end portions of said inner and outer sleeve sections, a central passageway extending through said inner sleeve section, a cord carried in said central passageway, a first knotted end connection comprising cut end portions of said sleeve inner and outer sections gathered about a first end of said cord and secured with binding, a second knotted end connection comprising said sleeve inner and outer section folded end portions gathered about said first knotted end connection and secured with binding, an inner shell and an outer shell formed by said second knotted end connection, an interior space located between said inner and outer shells, an oleophobic absorbent medium carried in said interior space, and a plug having a tapered-shaped body comprising said first and second knotted end connections located in one end of said central passageway, wherein during use said mix flows to said absorbent medium through said inner and outer shells with said oils in said nix adhering to said absorbent medium, said adhesion continuing until said bag discolors indicating saturation, and then said saturated bag is removed from said mix.

7. A bag as defined by claim 6 and further characterized by, said cord being in a form of a loop having a second looped end extending from an opposite end of said central passageway and a first end knot held by said first knotted end connection, wherein said cord first end knot inhibits release of said cord from said connection.

8. A bag as defined by claim 6 and further characterized by said absorbent medium including, a length of netting material wound about said inner shell, and a floatation strip carried by said netting material, wherein a specific gravity of said bag is less than one.

9. An absorbent bag useful for removing hydrocarbons from a hydrocarbon-water mix, said bag consisting of:

a ball-like shaped body, said body consisting of, an elongated central passageway defined by an inner porous sleeve having end openings located on opposite sides of said body, a porous outer sleeve spaced from said inner sleeve with ends of said outer sleeve connecting with ends of said inner sleeve to define an interior space, and an absorbent medium carried in said interior space, wherein when said bag is immersed in said mix, said mix flows into said bag interior space through said inner and outer sleeves where said hydrocarbons in said mix adhere to said absorbent medium and saturate and discolor said bag body, and then as said saturated bag is withdrawn from said mix to reduce said hydrocarbons in said mix, residual mix in said bag body drains back into said mix through said inner and outer sleeves regardless of bag orientation.

* * * * *